US009545605B2

(12) United States Patent
Dam et al.

(10) Patent No.: US 9,545,605 B2
(45) Date of Patent: Jan. 17, 2017

(54) METHOD AND APPARATUS FOR PASSING A MIXED VAPOUR AND LIQUID STREAM AND METHOD OF COOLING A HYDROCARBON STREAM

(75) Inventors: Willem Dam, The Hague (NL); Johan Jan Barend Pek, The Hague (NL); Leendert Johannes Arie Zoetemeijer, The Hague (NL)

(73) Assignee: SHELL OIL COMPANY, Houston, TX (US)

( * ) Notice: Subject to any disclaimer, the term of this patent is extended or adjusted under 35 U.S.C. 154(b) by 2205 days.

(21) Appl. No.: 12/517,722

(22) PCT Filed: Dec. 4, 2007

(86) PCT No.: PCT/EP2007/063214
§ 371 (c)(1),
(2), (4) Date: Jun. 4, 2009

(87) PCT Pub. No.: WO2008/068239
PCT Pub. Date: Jun. 12, 2008

(65) Prior Publication Data
US 2010/0078836 A1 Apr. 1, 2010

(30) Foreign Application Priority Data
Dec. 6, 2006 (EP) .................................. 06125504

(51) Int. Cl.
*B01F 3/04* (2006.01)
*B01F 3/20* (2006.01)
(Continued)

(52) U.S. Cl.
CPC ................. *B01F 3/20* (2013.01); *B01D 1/007* (2013.01); *B01D 5/0003* (2013.01);
(Continued)

(58) Field of Classification Search
CPC ...... B01F 3/20; B01F 3/04503; B01D 5/0003; B01D 5/0033; B01D 5/0051; B01D 5/0084; B01D 1/007; F28F 9/026; F28F 9/26
(Continued)

(56) References Cited

U.S. PATENT DOCUMENTS 2,669,099 A * 2/1954 Malkoff .......................... 62/426
4,449,828 A 5/1984 Mansour ....................... 366/147
(Continued)

FOREIGN PATENT DOCUMENTS

EP 1088192 4/2001 ................ F25J 1/02
JP 55012366 1/1980 ............... F25D 3/02
(Continued)

*Primary Examiner* — Frantz Jules
*Assistant Examiner* — Webeshet Mengesha

(57) ABSTRACT

In a method and apparatus for passing a mixed vapour and liquid stream between a first heat exchanger (101) and a second heat exchanger (102) the mixed vapour and liquid stream outflows from the first heat exchanger (101) through two or more outlets (104). Then, the mixed vapour and liquid stream in the outlets (104) passes through two or more intermediate conduits (103) to the second heat exchanger (102), after which the mixed vapour and liquid stream inflows from the intermediate conduits (103) into the second heat exchanger (102) through two or more inlets (105). The number (X) of outlets (104) is equal to or greater than the number (Y) of inlets (105).

14 Claims, 3 Drawing Sheets

(51) Int. Cl.
*B01D 1/00* (2006.01)
*B01D 5/00* (2006.01)
*F25J 5/00* (2006.01)
F28F 9/02 (2006.01)
F28F 9/26 (2006.01)

(52) U.S. Cl.
CPC ......... *B01D 5/0033* (2013.01); *B01D 5/0051* (2013.01); *B01D 5/0084* (2013.01); *B01F 3/04503* (2013.01); *F25J 5/002* (2013.01); *F25J 2270/12* (2013.01); *F25J 2290/32* (2013.01); *F28F 9/026* (2013.01); *F28F 9/26* (2013.01)

(58) Field of Classification Search
USPC ......... 62/606, 611, 612, 614, 618, 525, 526; 165/139, 143, 144, 150
See application file for complete search history.

(56) References Cited

U.S. PATENT DOCUMENTS

| | | | |
|---|---|---|---|
| 5,150,749 A | 9/1992 | Bergmann et al. | 165/115 |
| 6,389,844 B1 | 5/2002 | Klein Nagel Voort | 62/612 |
| 2006/0086140 A1 | 4/2006 | Eaton et al. | 62/612 |
| 2007/0175240 A1* | 8/2007 | Jager | 62/612 |

FOREIGN PATENT DOCUMENTS

| | | | | |
|---|---|---|---|---|
| JP | 60232494 | 11/1985 | | F28D 3/00 |
| JP | 2000055520 | 2/2000 | | F25D 3/10 |
| SU | 158896 | 11/1963 | | F25B 39/02 |
| SU | 1814716 | 5/1993 | | F25B 39/00 |
| WO | WO8903723 | 5/1989 | | B01F 3/10 |

\* cited by examiner

— 1 —
METHOD AND APPARATUS FOR PASSING A MIXED VAPOUR AND LIQUID STREAM AND METHOD OF COOLING A HYDROCARBON STREAM

The present application claims priority from European Patent Application 06125504.8 filed 6 Dec. 2006.

FIELD OF THE INVENTION

The present invention relates to a method and an apparatus for passing a mixed vapour and liquid stream between heat exchangers, particularly but not exclusively a mixed vapour and liquid stream involved in liquefying a hydrocarbon stream such as a natural gas stream.

In another aspect, the present invention relates to a method of cooling, preferably for liquefying, a hydrocarbon stream such as a natural gas stream.

BACKGROUND OF THE INVENTION

Several methods of liquefying a natural gas stream thereby obtaining liquefied natural gas (LNG) are known. It is desirable to liquefy a natural gas stream for a number of reasons. As an example, natural gas can be stored and transported over long distances more readily as a liquid than in gaseous form, because it occupies a smaller volume and does not need to be stored at a high pressure.

Usually natural gas, comprising predominantly methane, enters an LNG plant at elevated pressures and is pre-treated to produce a purified feed stock suitable for liquefaction at cryogenic temperatures. The purified gas is processed through a plurality of cooling stages using heat exchangers to progressively reduce its temperature until liquefaction is achieved. The liquid natural gas is then further cooled (to reduce flashed vapour through one or more expansion stages) to final atmospheric pressure suitable for storage and transportation. The flashed vapour from each expansion stage can be used as a source of plant fuel gas.

In LNG plants, streams comprising a mixture of vapour and liquid phases pass, for example between two heat exchangers. One example is shown in FIG. 3 of U.S. Pat. No. 6,389,844 B1.

U.S. Pat. No. 6,389,844 B1 relates to a plant for liquefying natural gas. FIG. 3 shows an embodiment for pre-cooling the natural gas, involving first and second stage heat exchangers 102' and 102. Between these first and second stage heat exchangers, there are two conduits 150 and 151, one for refrigerant and one for natural gas. The refrigerant and natural gas are mixed vapour and liquid streams, and such streams are carried by a single conduit between the heat exchangers 102' and 102.

However, this way of passing streams between two heat exchangers can result in an uneven distribution of the vapour and liquid phases of the streams passing through the conduits 150 and 151. As a consequence, there may be non-uniform distribution of the vapour and liquid phases going into the second stage heat exchanger 102, which results in an uneven temperature distribution and therefore inefficiency in the second stage heat exchanger 102.

It is an object of the present invention to improve passing a mixed vapour and liquid stream between two heat exchangers.

It is a further object of the present invention to reduce the energy requirements of a cooling plant or method.

SUMMARY OF THE INVENTION

The present invention provides a method of passing a mixed vapour and liquid stream between a first heat exchanger and a second heat exchanger, comprising the steps of:
(a) outflowing the mixed vapour and liquid stream from the first heat exchanger through two or more (number X) outlets;
(b) passing the mixed vapour and liquid stream in the outlets through two or more intermediate conduits to the second heat exchanger; and
(c) inflowing the mixed vapour and liquid stream from the intermediate conduits into the second heat exchanger through two or more (number Y) inlets;
wherein X is equal to or greater than ($\geq$) Y.

Embodiments of the present invention extend to use with mixed vapour and liquid streams of refrigerant used to cool another stream or streams such as a hydrocarbon stream, for example natural gas. Many refrigerants are known, and include without limitation, natural gas itself, ethane, ethylene, propane, propylene, butane, pentane, and nitrogen, either as single components, or using two or more to form a mixed refrigerant.

In a further aspect, the present invention provides an apparatus for passing a mixed vapour and liquid stream between a first heat exchanger and a second heat exchanger, the apparatus at least comprising:
two or more (number: X) outlets for the first heat exchanger to outflow the mixed vapour and liquid stream from the first heat exchanger;
two or more intermediate conduits to pass the mixed vapour and liquid stream in the outlets to the second heat exchanger; and
two or more (number: Y) inlets to pass the mixed vapour and liquid stream from the intermediate conduits into the second heat exchanger;
wherein X is equal to or greater than ($\geq$) Y.

In another aspect, the present invention provides a method of cooling a hydrocarbon stream such as natural gas, the method at least comprising the step of: passing the hydrocarbon stream through a cooling stage involving two or more heat exchangers, between which heat exchangers a mixed vapour and liquid stream passes as hereindefined.

BRIEF DESCRIPTION OF THE DRAWINGS

Embodiments of the present invention will now be described by way of example only, and with reference to the accompanying non-limiting diagrammatic drawings in which.

DETAILED DESCRIPTION OF THE INVENTION

Figure 1:
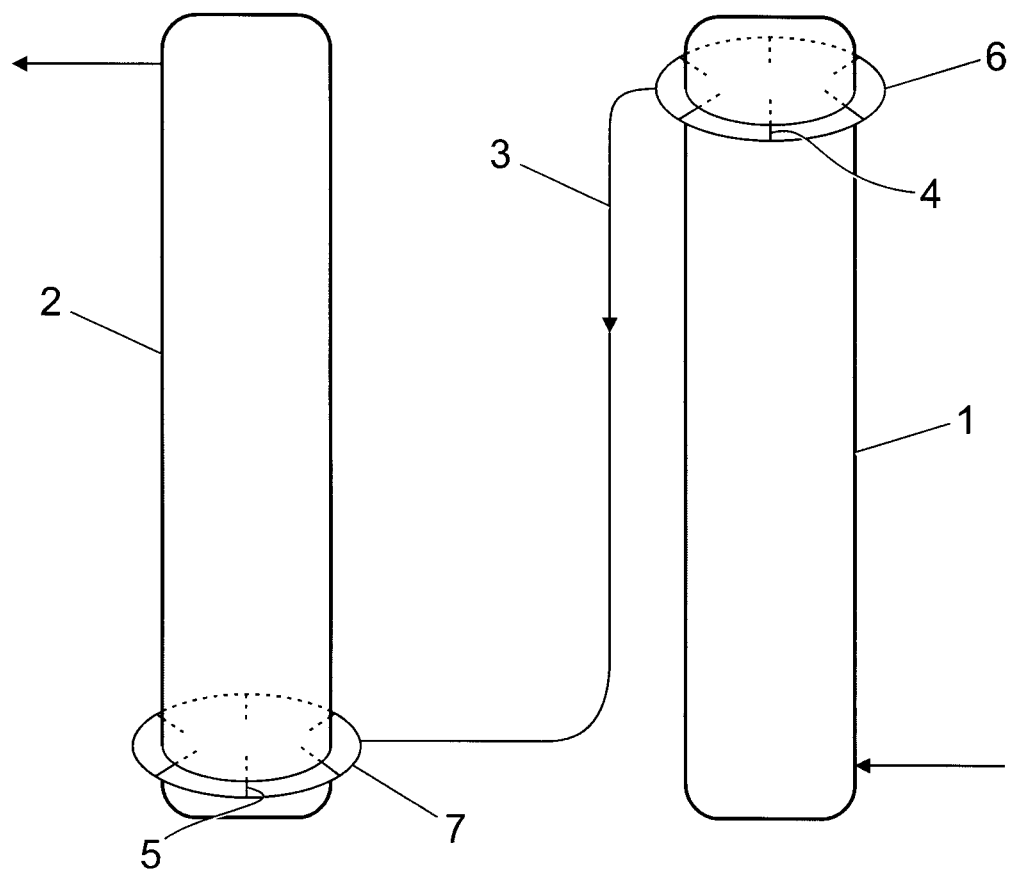
FIG. 1 is a simplified view of two heat exchangers connected according to one method.

For the purpose of this description, a single reference number will be assigned to a line as well as a stream carried in that line.

The configurations of the lines, conduits and streams in the accompanying drawings are not limiting, and are generally figurative in order to better illustrate the present invention.

In embodiments herein proposed, a mixed vapour and liquid stream outflows from a first heat exchanger through two or more outlets, then passes through two or more intermediate conduits to a second heat exchanger, and then inflows from the intermediate conduits into the second heat exchanger through two or more inlets, whereby the number of said outlets (which may hereinafter be represented by X) is equal to or greater than (which may hereinafter be represented by a symbol the number of said inlets (which may hereinafter be represented by Y).

By passing the mixed vapour and liquid stream through direct conduits from the first heat exchanger to the second heat exchanger, there is a reduction in any mal-distribution of the mixed vapour and liquid stream that has hitherto been passed between two heat exchangers through a single conduit.

By providing a more uniform passage of the mixed vapour and liquid stream, there will also be a more even temperature distribution of the liquid and vapour phases in the second heat exchanger. In this way, the present invention can reduce the overall energy requirements of a method or plant or apparatus for cooling, in particular liquefying, a hydrocarbon stream, and/or make the method, plant or apparatus more efficient and so more economical.

The present invention can be used for any mixed vapour and liquid stream, including but not limited to mixed vapour and liquid stream in the form of a hydrocarbon stream to be cooled and/or liquefied, or in the form of a refrigerant stream, in particular a mixed refrigerant stream.

A hydrocarbon stream can be cooled, particularly liquefied, by passing it through two or more cooling stages involving heat exchangers. Any number of cooling stages can be used, and each cooling stage can involve two or more heat exchangers, as well as optionally one or more steps, levels or sections. Each cooling stage may involve two or more heat exchangers either in series, or in parallel, or a combination of same. Arrangements of suitable heat exchangers able to liquefy a hydrocarbon stream such as natural gas are known in the art.

A hydrocarbon stream for a cooling and/or liquefying method or plant may be any suitable hydrocarbon-containing stream to be cooled and/or liquefied, but is usually a natural gas stream obtained from natural gas or petroleum reservoirs. As an alternative the natural gas stream may also be obtained from another source, also including a synthetic source such as a Fischer-Tropsch process.

Usually, natural gas is comprised substantially of methane. Preferably the hydrocarbon stream comprises at least 60 mol % methane, more preferably at least 80 mol % methane.

Depending on the source, the natural gas may contain varying amounts of hydrocarbons heavier than methane such as ethane, propane, butanes and pentanes as well as some aromatic hydrocarbons. The natural gas stream may also contain non-hydrocarbons such as $H_2O$, $N_2$, $CO_2$, $H_2S$ and other sulphur compounds, and the like.

The first and second heat exchangers may be any suitable units or vessels generally having two or more streams flowing therethrough, wherein at least one stream is intended to cool at least one other stream. Various types, designs and shapes of heat exchangers are known in the art, examples of which are shell-and-tube heat exchangers, particularly such as spool-wound heat exchangers.

The first heat exchanger may have any number of outlets, including for example 2 to 20 outlets, preferably 3, 4, 5, 6, 7, 8, 9 or 10 outlets.

The number of outlets from the first heat exchanger may be the same or different to the number of inlets of the second heat exchanger, and may also be the same or different to the number of intermediate conduits. Similarly, the number of intermediate conduits may be the same or different to the number of inlets in the second heat exchanger.

Where the number of outlets is different to the number of intermediate conduits and/or number of inlets, and the number of intermediate conduits is different to the number of inlets, then there is preferably equipartition of the required division, sharing and/or combination of streams from and to the outlets, intermediate conduits and inlets. That is, the division, sharing and/or combination is, or seeks to achieve, equality as far as possible between the number of streams provided and the number of streams to be provided, taking into account other parameters or circumstances that may affect the division, sharing or combinations, such as flow disturbances or operational parameters.

In one example of the present invention, the number of outlets equals the number of intermediate conduits which equals the number of inlets in the second heat exchanger. Thus, there are effectively direct passages of the mixed vapour and liquid stream from the first heat exchanger through a number of outlets, intermediate conduits and inlets, into the second heat exchanger.

In another example, the number of outlets from the first heat exchanger is greater than the number of intermediate conduits, and the number of intermediate conduits equals the number of inlets into the second heat exchanger. Thus, the mixed vapour and liquid streams through the outlets are combined to equal the number of intermediate conduits, the combining preferably having equipartition as far as possible.

If desired, the hydrocarbon stream may be pre-treated before using it in the present invention. This pre-treatment may comprise removal of any undesired components present such as $CO_2$ and $H_2S$, or other steps such as pre-cooling, pre-pressurizing or the like. As these steps are well known to the person skilled in the art, they are not further discussed here.

Although the method according to the present invention is applicable to various hydrocarbon feed streams, it is particularly suitable for natural gas streams to be liquefied. As the person skilled readily understands how to liquefy a hydrocarbon stream, this is not further discussed in detail herein.

FIG. 1 shows a first heat exchanger 1 which may be, for example, a high pressure heat exchanger for use in a first or pre-cooling stage of a method and plant for liquefying a hydrocarbon stream such as natural gas. Such heat exchangers are well known in the art, and are usually 'multi-tube' or 'shell-and-tube' heat exchangers. Such heat exchangers can contain hundreds or thousands (or greater) small-diameter vertical or spiral, and open-ended reactor tubes.

Usually, the tubes are collected into several 'bundles' which have a single bonnet, chamber, header or manifold designed to collect mixed vapour and liquid streams from all the tubes of that bundle, and pass them out of the top of the first heat exchanger 1 through an outlet. FIG. 1 shows six outlets 4 from the top of the first heat exchanger 1 having six bundles, which outlets 4 pass their streams into a collecting ring 6 which collects all the mixed vapour and liquid streams, and passes them as a combined stream into a single conduit 3 for passage to the next heat exchanger 2. A single conduit 3 for passage of all the mixed vapour and liquid streams to the next heat exchanger 2 has hitherto been regarded as most simple and economic arrangement because of the distance between the outflow of one heat exchanger and the inflow of another heat exchanger.

However, reactors or heat exchangers are not usually so uniform as to provide for the distribution or ratio of the mixed liquid and vapour phases of streams out of each of its tubes to be the same. Variation will occur, and this leads to variation in the distribution of the liquid and vapour phases passing out of the first heat exchanger 1 and through the interconnecting conduit 3 to the next heat exchanger 2. In general, this non-uniformity of the distribution and composition of the mixed vapour and liquid stream passing through the conduit 3 may cause a non-uniform distribution of the mixed stream into the second heat exchanger 2.

As described above for the first heat exchanger 1, the second heat exchanger 2 usually comprises hundreds or thousands of small diameter tubes, usually also collected into a number of 'bundles'. One common number of bundles is six. At or near the base of the heat exchanger 2, each bundle has a single bonnet, chamber, header or manifold designed to provide a stream of material into each tube from a common source. Usually, the source for each bundle of tubes is an inlet, and six inlets 5 are shown in FIG. 1. The inlets derive their stream of material from a distribution ring 7 supplied by the single conduit 3.

The distribution ring 7 is generally horizontal, so as to try and feed a liquid and vapour stream into each of the inlets 5 most efficiently from all sides of the second heat exchanger 2. However, any horizontal passage of a mixed liquid and vapour stream results in some stratifying of the phases due to the heavier weight of the liquid phase causing it to sink, and the generally faster speed of vapour, causing the vapour phase to flow faster over the sinking liquid phase. Thus, horizontal flow of a mixed vapour and liquid stream generally increases the non-uniformity of the liquid and vapour phases as they pass around the distribution ring 7 to reach each of the inlets 5. The further such streams travel horizontally, including around a distribution ring, the greater this stratifying effect As a result of the above, there is an uneven temperature distribution in the liquid and vapour phases over the length of the second heat exchanger 2. These can result in power misbalance between, for example, a first or pre-cooling stage of a liquefying plant using the first and second heat exchangers 1, 2 shown in FIG. 1, and a main liquefaction stage. This can lead to an increased power requirement for the main liquefaction stage and so an increase in the total power required for the liquefaction method or plant.

The arrangement shown in FIG. 1 is not known to the applicants to be known in the art, but the present invention provides one or more improvements thereof.

Figure 2:
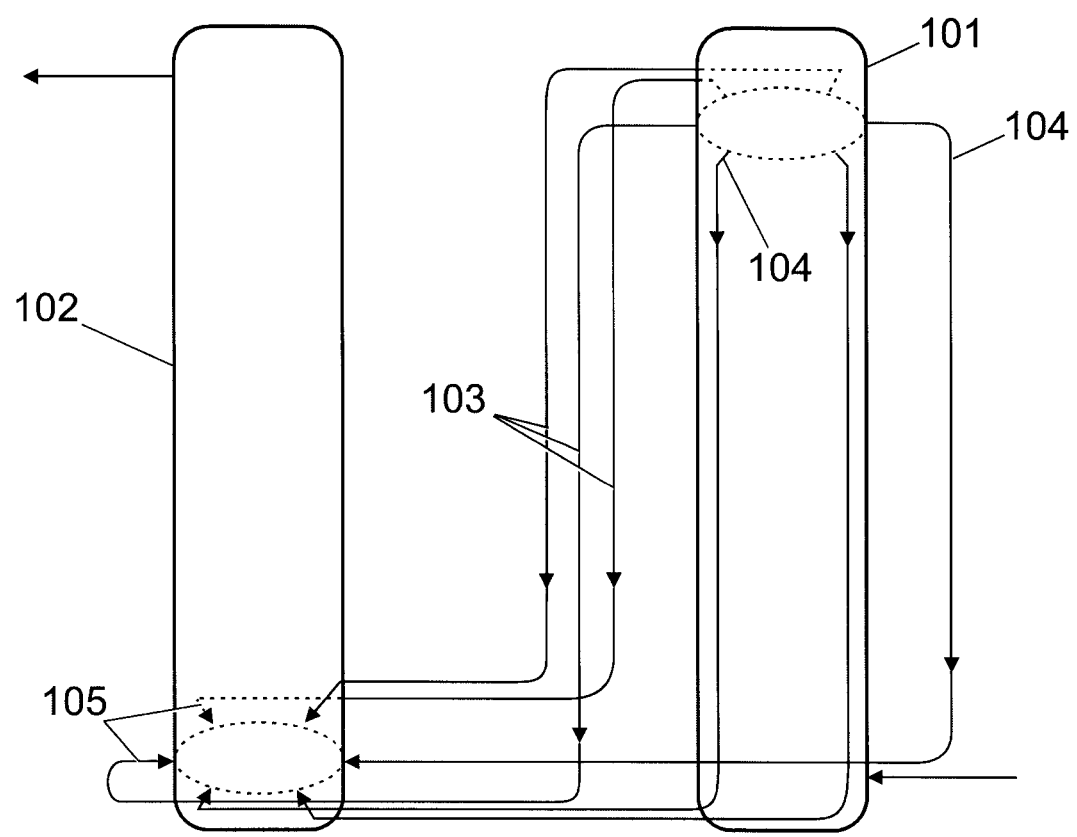
FIG. 2 is a simplified side view of a first embodiment of the present invention.

FIG. 2 shows a first embodiment of the present invention between first and second heat exchangers 101 and 102, similar to those shown in FIG. 1 in, for example, an LNG plant.

The first and second heat exchangers 101 and 102 could be involved in the cooling of a hydrocarbon stream such as natural gas. One example of this is a first cooling stage in an LNG plant, designed to reduce the temperature of the natural gas from its initial feed temperature after any pre-treatment, to below 0° C., for example between −20° C. and −50° C. To effect this, the natural gas can pass through two or more heat exchangers, and be cooled against one or more refrigerants such as propane, or a mixed refrigerant as hereinbefore described.

Between the heat exchangers of the first cooling stage, either or both of the natural gas stream and the refrigerant stream may travel, and such streams may be mixed vapour and liquid streams. One example is the first heat exchanger 101 being a high pressure heat exchanger, in which a mixed refrigerant is allowed to evaporate at a 'high' pressure, to then pass to a low pressure heat exchanger for further evaporation.

The first heat exchanger 101 could be a shell-and-tube heat exchanger, in which a mixed refrigerant is evaporated and collected near the top thereof. One form of collection can be in a common manifold above a tube sheet or tube plate as described hereinbefore. From such a common manifold, there can be any number of outlets able to receive the mixed vapour and liquid stream of material created by the first heat exchanger 101. In the embodiment shown in FIG. 2, there are six outlets 104.

Generally, the six outlets 104 will pass the same or similar flow of the mixed vapour and liquid stream therethrough.

All the mixed vapour and liquid stream from the first heat exchanger 101 is desired to be passed to the second heat exchanger 102. To effect this, the six outlets 104 from the top of the first heat exchanger 101 are directly connected to six intermediate conduits 103, which are in turn directly connected to six inlets 105 of the second heat exchanger 102. The inlets 105 are preferably located at or near the base or lower part of the second heat exchanger 102. By direct introduction of each mixed liquid and vapour stream into the second heat exchanger 102 via each respective outlet 104 and inlet 105, there is avoided the combining of all the streams into only one conduit (for example conduit 3 in FIG. 1), which reduces or minimizes the problem of the redistribution of the single mixed vapour and liquid stream into all the tubes of the second heat exchanger 102.

Thus, there is provided a more even introduction of the mixed liquid and vapour stream into the heat exchanger 102, reducing or minimizing the maldistribution of the liquid and vapour phases in the mixed stream outflowing the first heat exchanger 101, leading to a more even temperature distribution of the mixed vapour and liquid stream in the second heat exchanger 102, and thus more efficient use or processing of the stream through the second heat exchanger 102.

The present invention provides a further advantage by avoiding the need for a distribution ring (such as the distribution ring 7 shown in FIG. 1) around the second heat exchanger 102. The direct passage of the mixed vapour and liquid streams from the outlets 104 to the inlets 105 of the second heat exchanger 102 therefore reduces capital costs, and also avoids stratifying caused by a distribution ring.

Preferably, the intermediate conduits 103 are positioned or located such as to reduce, more preferably minimise, any horizontal passage or transfer of the mixed vapour and liquid streams provided through the outlets 104, so as to also minimise stratifying of the phases as far as possible prior to their entry into the second heat exchanger 102.

The arrangement shown in FIG. 2 is usable between any two heat exchangers. Some cooling stages in a hydrocarbon liquefying plant can use 3, 4, 5 or 6 heat exchangers such as heat exchangers in series, between which there may be mixed liquid and vapour streams. For example, heat exchangers at different pressure levels. The arrangement shown in FIG. 2 may be useable in a number of locations between such heat exchangers.

The arrangement shown in FIG. 2 may also be to reduce or minimize the maldistribution of a mixed vapour and liquid stream which is being passed on to two or more different heat exchangers, rather than all the stream being passed to a single further heat exchanger. As an example, one or more of the outlets 104 of the first heat exchanger 101 may pass their stream or streams to one heat exchanger, and one or more other outlets may pass a stream or streams to another heat exchanger.

It is possible in an industrial plant or facility such as a liquefied natural gas plant, that first and second heat exchangers are not equal in size, capacity or design. For example, it is possible that first heat exchanger is larger than the second heat exchanger, or at least has a greater heat exchange area therein. Thus, there may be a greater number of outlets of the first heat exchanger (compared to the number of inlets in the second heat exchanger), due to the greater number of reactor tubes (or other heat exchange arrangement) in the first heat exchanger.

Figure 3:
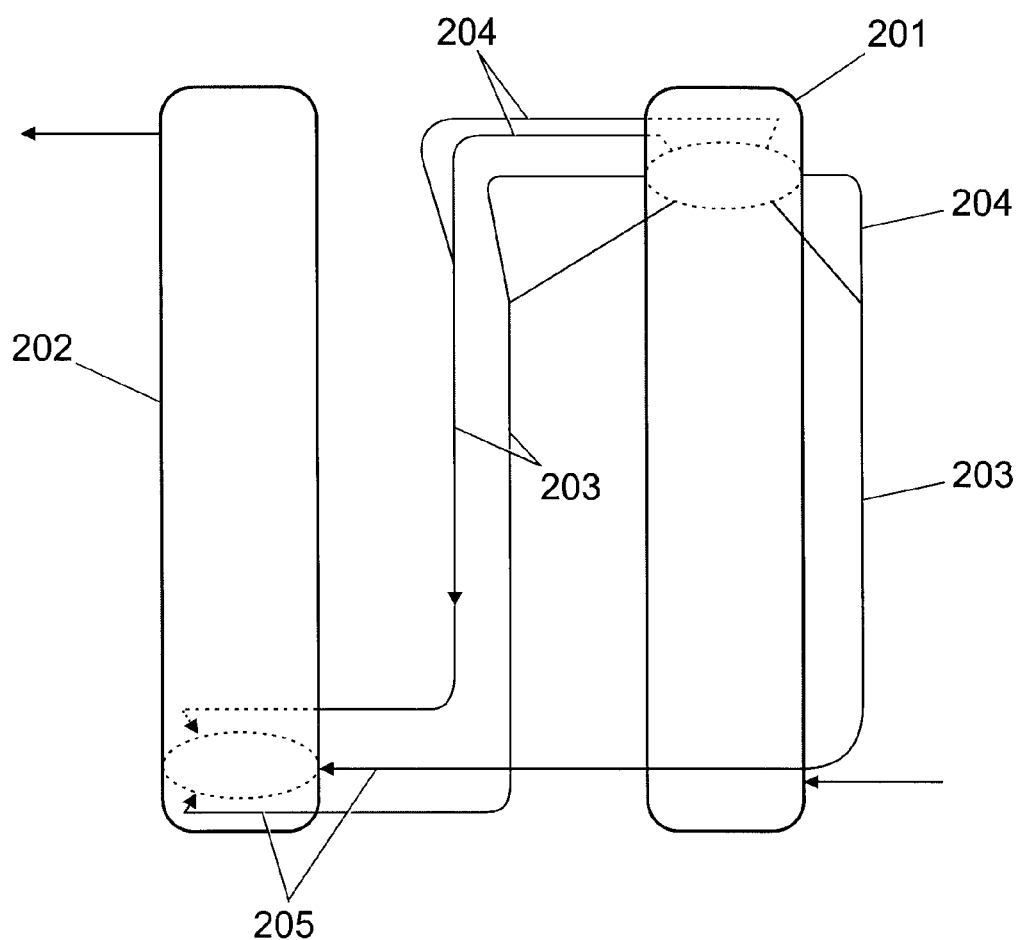
FIG. 3 is a simplified side view of a second embodiment of the present invention.

It is also generally preferred to minimise the piping required in a large industrial plant or facility.

Where the number of outlets of the first heat exchanger is greater than the number of inlets of the second heat exchanger, the arrangement shown in FIG. 3 is useable, wherein two or more of the outlets of the first heat exchanger are combined to a fewer number of intermediate conduits.

FIG. 3 shows a second embodiment of the present invention between first and second heat exchangers 201 and 202, similarly to those shown in FIGS. 1 and 2 in, for example, an LNG plant.

The first heat exchanger 201 in FIG. 3 has, again by example only, six outlets 204 for a flow of mixed vapour and liquid stream to be passed to the second heat exchanger 202.

To reduce the number of intermediate conduits between the first and second heat exchangers 201, 202, there is equipartition of the outlets 204 into three intermediate conduits 203. The equipartition comprises combining the mixed vapour and liquid streams flowing through two of the outlets 204 into one intermediate conduit 203, such that the six outlets 204 shown in FIG. 3 provide their streams into three intermediate conduits.

Other ratios of the number of outlets and intermediate conduits are possible, as are other ratios of intermediate conduits to inlets (into the second heat exchanger), and outlets to inlets. Arrangements for any other such ratios are applicable by a person skilled in the art, preferably using equipartition as far as possible of the distribution, sharing or combination of streams thereinbetween.

The combination of the streams from the outlets 204 into the intermediate conduits 203 in FIG. 3, as well as in any other arrangement, preferably occurs or is located in a vertical part, fraction or section of the passage of the mixed vapour and liquid stream from the first heat exchanger 201 to the second heat exchanger 202. As mentioned above, preferably, any subsequent horizontal passage or transfer of the mixed vapour and liquid streams in the intermediate conduits 203 is reduced, more preferably minimised, so as to minimise stratifying of the mixed vapour and liquid streams due to horizontal flow.

The three intermediate conduits 203 pass their mixed streams directly into three corresponding inlets 205 of the second heat exchanger 202.

Thus, in FIG. 3, there is direct provision of the mixed vapour and liquid streams in the intermediate conduits 203 into the second heat exchanger 202 through the corresponding inlets 205.

The present invention includes a method of passing a mixed vapour and liquid stream between first and second heat exchangers in a first or pre-cooling stage of a three-stage dual mixed-refrigerant process such as that shown in EP 1088192 A1, the first or pre-cooling stage of the process shown in U.S. Pat. No. 6,389,844 B1, and/or the liquefaction stage or system of any other liquefaction process, in particular those using a multi-phased mixed refrigerant and involving two cryogenic heat exchangers.

The person skilled in the art will understand that the present invention can be carried out in many various ways without departing from the scope of the appended claims.

What is claimed is:

1. A method of passing a mixed vapour and liquid stream between a first heat exchanger and a second heat exchanger, comprising the steps of: (a) outflowing the mixed vapour and liquid stream from the first heat exchanger through two or more (number: X) outlets; (b) passing the mixed vapour and liquid stream in the outlets through two or more intermediate conduits to the second heat exchanger; and (c) inflowing the mixed vapour and liquid stream from the intermediate conduits into the second heat exchanger through two or more (number: Y) inlets; wherein X is equal to or greater than Y.

2. A method as claimed in claim 1, wherein, when X is greater than Y, wherein the portions of the mixed vapour and liquid streams stream from the two or more outlets are combined either prior to or during step (b) to provide Y number of portions of the mixed vapour and liquid stream streams for the inlets.

3. A method as claimed in claim 2, wherein there is equipartition of the mixed vapour and liquid streams stream from the outlets to provide the Y number of portions of the mixed vapour and liquid stream streams for the inlets.

4. A method as claimed in claim 1, wherein the number of inlets equals the number of intermediate conduits.

5. A method as claimed in claim 1, wherein the mixed vapour and liquid stream is a refrigerant stream.

6. A method as claimed in claim 1, wherein the mixed vapour and liquid stream is a hydrocarbon stream.

7. A method as claimed in claim 1, wherein the first and second heat exchangers cool a hydrocarbon stream.

8. A method as claimed in claim 7, wherein the first and second heat exchangers are shell-and-tube heat exchangers.

9. A method as claimed in claim 1, wherein the first heat exchanger has 2 to 20 outlets.

10. Apparatus for passing a mixed vapour and liquid stream between a first heat exchanger and a second heat exchanger, the apparatus at least comprising: two or more (number: X) outlets for the first heat exchanger to outflow the mixed vapour and liquid stream from the first heat exchanger; two or more intermediate conduits to pass the mixed vapour and liquid stream in the outlets to the second heat exchanger; and two or more (number: Y) inlets to pass the mixed vapour and liquid stream from the intermediate conduits into the second heat exchanger; wherein X is equal to or greater than Y.

11. A method of cooling a hydrocarbon stream, the method at least comprising the step of: passing the hydrocarbon stream through a cooling stage involving two or more heat exchangers, between which heat exchangers a mixed vapour and liquid stream passes via the steps of: (a) outflowing the mixed vapour and liquid stream from the first heat exchanger through two or more (number: X) outlets; (b) passing the mixed vapour and liquid stream in the outlets through two or more intermediate conduits to the second heat exchanger; and (c) inflowing the mixed vapour and liquid stream from the intermediate conduits into the second heat exchanger through two or more (number: Y) inlets; wherein X is equal to or greater than Y.

12. A method as claimed in claim 11 for liquefying a hydrocarbon stream to provide a liquefied hydrocarbon stream.

13. A method as claimed in claim 2, wherein the number of inlets equals the number of intermediate conduits.

14. A method as claimed in claim 3, wherein the number of inlets equals the numbers of intermediate conduits.

* * * * *